H. E. SPANGLER.
SPRING MECHANISM.
APPLICATION FILED FEB. 14, 1919.
1,371,124.
Patented Mar. 8, 1921.
3 SHEETS—SHEET 1.
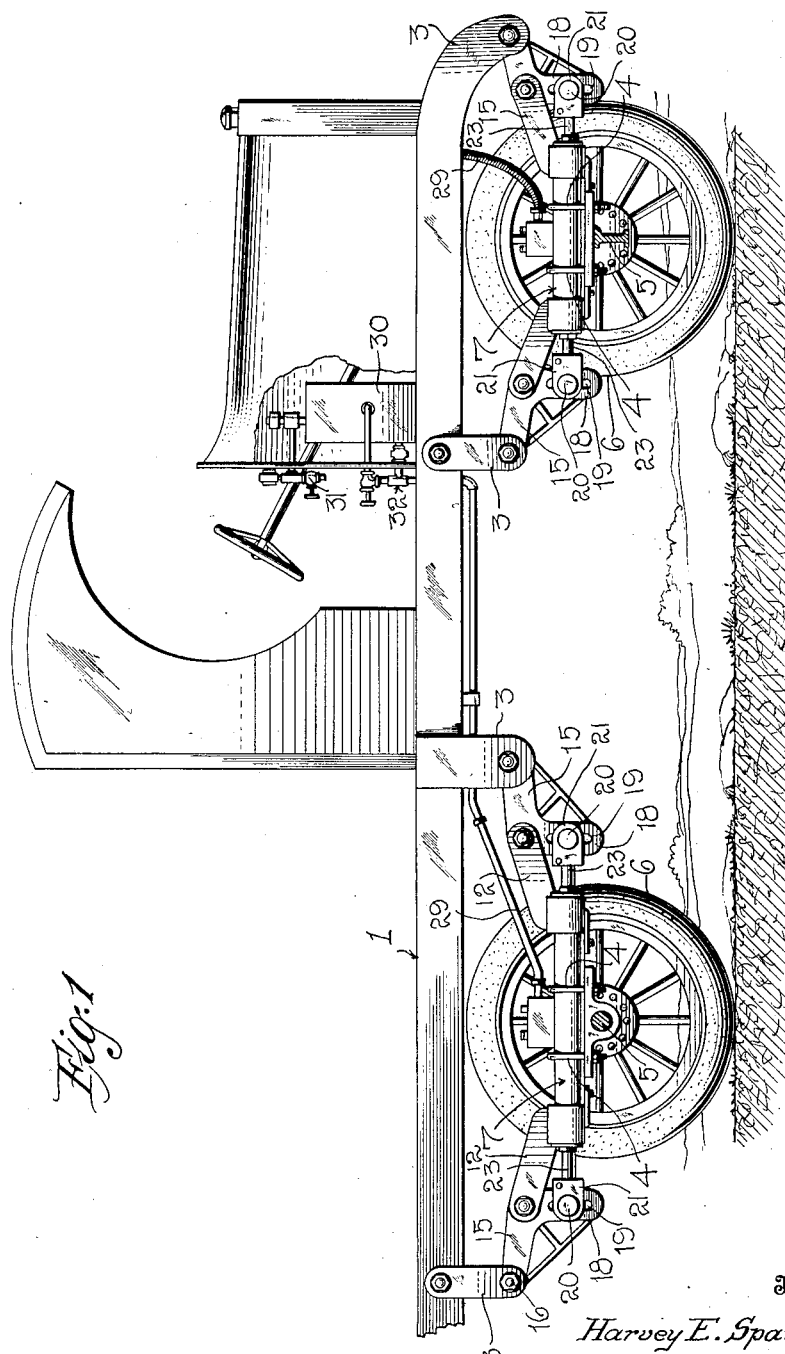

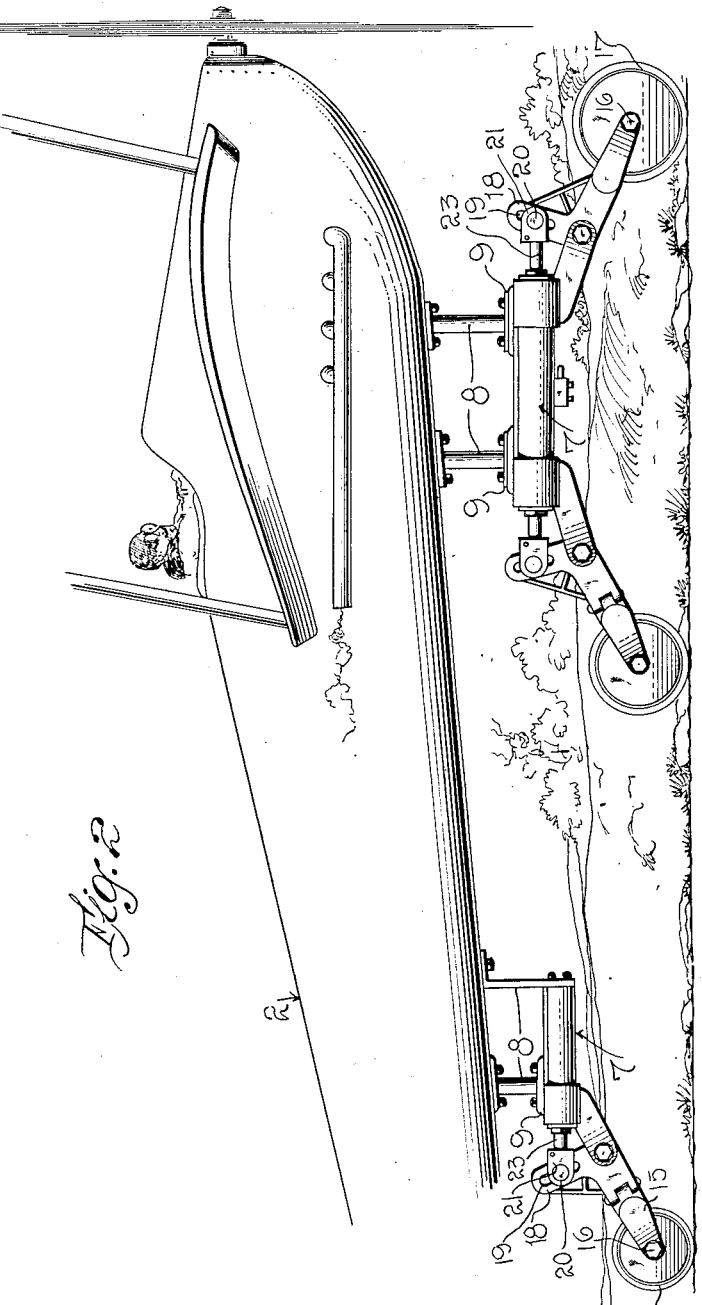

H. E. SPANGLER.
SPRING MECHANISM.
APPLICATION FILED FEB. 14, 1919.
1,371,124.
Patented Mar. 8, 1921.
3 SHEETS—SHEET 3.
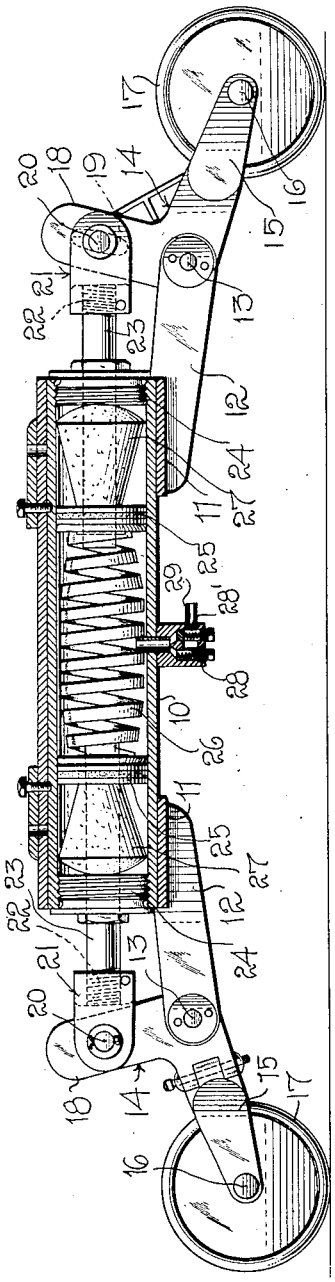
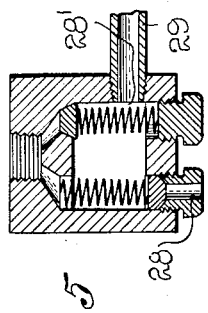
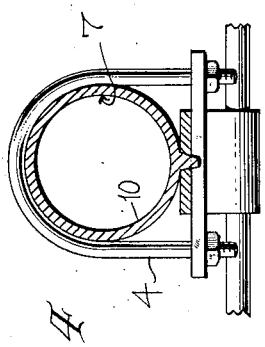
Inventor
Harvey E. Spangler:
By Philip A. H. Pernell
Attorney

UNITED STATES PATENT OFFICE.

HARVEY E. SPANGLER, OF BUFFALO, NEW YORK.

SPRING MECHANISM.

1,371,124.              Specification of Letters Patent.        Patented Mar. 8, 1921.

Application filed February 14, 1919. Serial No. 276,963.

*To all whom it may concern:*

Be it known that I, HARVEY E. SPANGLER, a citizen of the United States, residing at Buffalo, in the county of Erie and State of New York, have invented certain new and useful Improvements in Spring Mechanisms, of which the following is a specification.

My invention relates to improvements in vehicle spring mechanism and is particularly constructed for use upon airplanes, trucks, tractors, or in fact, upon any character of vehicle where it would perform its functions in a practical manner.

One object of my invention is the provision of a spring mechanism which can be used upon an airplane to form the fore and aft landing gear, or upon a motor vehicle to support the ground or supporting wheels and which will operate in either situation to provide a practical and efficient spring support.

Another object is to provide a mechanism of the character and for the purposes stated which will provide a proper spring and cushion support and which will dispose its component parts to evenly receive and distribute the strains and thus form a practical shock absorber.

Another object of my invention is the provision of a spring construction which while performing its inherent functions will utilize the movements of its parts to pump and store air, for such uses as inflating tires, cooling the engine, or other functions.

Another object of my invention is the provision of a spring mechanism which will be of simple, durable and inexpensive construction to insure an efficient and practical improvement in every particular.

With these objects in view the invention consists of a spring mechanism embodying novel features of construction, combination and arrangement of parts for service, substantially as shown, described and claimed herein.

In order that the details of construction and the operation of my invention may be understood and its many features of merit be fully appreciated, I invite attention to the accompanying drawings, in which:

Figure 1 is a side elevation of a motor vehicle equipped with my spring mechanism for the supporting wheels.

Fig. 2 is a similar view of an airplane provided with fore and aft landing or ground gear constructed in accordance with my invention;

Fig. 3 is a sectional view on an enlarged scale of one of the units carrying the spring mechanism, the most important feature of my invention;

Fig. 4 is a detail view of one of the clamping yokes for securing one of the units to an axle, and, Fig. 5 is a detail sectional view of the air inlet and outlet valves of each unit.

Referring by numeral to the drawings in which similar numerals of reference denote the same parts in all the views:

The numeral 1 designates the body or chassis of a motor vehicle and 2 denotes the body or fuselage of an airplane, my mechanism being capable of use in connection with either.

When used with a motor vehicle suitable brackets or connections 3 depend from the body and clamping yokes 4 are employed to secure the units to the axles 5, which carry the ground wheels 6, which in applying the units 7 to the body or fuselage of an airplane, I use depending rods or brackets 8, secured to the units 7, by means of the plates 9.

It will thus be seen that the invention can be used with equal facility and adaptability upon a motor vehicle or upon aircraft as circumstances demand, and in each case four units are employed, each consisting of a horizontally arranged casing 10 having secured to each end a collar 11, formed with an arm 12, to which is fulcrumed at 13, the angle shaped levers 14, in the lower limb 15 of which is mounted the axle 16 for the ground wheels 17, while the upper limb 18 of said angle levers is slotted at 19.

In the slots 19, of said limbs 18, fit the pins 20 connected to the heads 21, whose inner ends are connected with the outer ends 22 of the piston rods 23, guided in the plugs 24, and carrying the pistons 25, between whose inner faces are interposed the coiled cushion spring 26. Between the pistons 25 and the plugs 24 are disposed the elastic blocks forming buffers 27 while each cylinder is provided with a combination inlet 28 and outlet 28', with oppositely-working spring-seated valves, as seen in detail in Fig. 5, there being a pipe 29 leading from said outlet 28' to a storage tank 30, as seen in Fig. 1, having means as 31 to inflate tires, and means as 32 for cooling the engine, or for other purposes. Removable plugs permit ready access to the valves, as will be understood from Fig. 5.

The operation of my spring mechanism will be so obvious from an inspection of the drawings, taken in connection with the description that it is deemed unnecessary to give a detailed statement, suffice to say that the invention is capable of use upon any character of vehicle or aircraft, it provides a perfect spring support and shock absorber, also may be used to compress and store air, is of simple, compact, durable and inexpensive construction and will prove efficient and practical from every point of view.

I claim:—

1. In a spring mechanism, the combination with the vehicle body and its supporting wheels, of angle levers pivotally mounted, one arm of each lever carrying a supporting wheel and the other arm being slotted, pins working in the slots, a head connected with a pin, a piston rod connected with the head, a cylinder interposed between the heads, pistons carried by said rods, and working in said cylinder, a spring interposed between the pistons, and elastic buffers upon the other side of said pistons.

2. In a spring mechanism, the combination with the vehicle body and its supporting wheels, of angle levers pivotally mounted, one arm of each lever carrying a supporting wheel and the other arm being slotted, pins working in the slots, a head connected with each pin, a piston rod connected with each head, a cylinder interposed between the heads, pistons carried by said rods, and working in said cylinder, a spring interposed between the pistons, elastic buffers upon the other side of said pistons, and a combined inlet and outlet valve on the cylinder between the said pistons.

3. A spring unit of the character and for the purpose described, consisting of a casing, a pair of pistons fitting therein, rods connected to said pistons, and projecting from said casing, a coiled spring between the opposing faces of said pistons, a pair of elastic buffers between the ends of the casing, and outer faces of said pistons, a combined spring inlet and outlet valve for the casing between the pistons with a connection with the casing common to both the inlet and the outlet, angle levers fulcrumed to said casing, having one limb connected to the piston rods and the other end forming the mount for the wheels.

4. In a spring mechanism the combination with a vehicle body and wheels, a series of spring units mounted between said body and wheels, each of said units consisting of a casing, a pair of pistons fitting therein, rods connected to said pistons and projecting from said casing, a coiled spring between the opposing faces of said pistons, inlet and outlet valves for the casing, and connections between one end of said rods and a mounting for the wheels.

In testimony whereof I affix my signature.

HARVEY E. SPANGLER.